(12) United States Patent
Sikkenga et al.

(10) Patent No.: US 8,945,263 B2
(45) Date of Patent: Feb. 3, 2015

(54) FILTER AND METHOD FOR GREASE FILTRATION

(75) Inventors: Daniel Sikkenga, Adrian, MI (US); Robert Prasser, Lakewood, WI (US)

(73) Assignee: Blissfield Manufacturing Company, Blissfield, MI (US)

( * ) Notice: Subject to any disclaimer, the term of this patent is extended or adjusted under 35 U.S.C. 154(b) by 509 days.

(21) Appl. No.: 12/880,051

(22) Filed: Sep. 10, 2010

(65) Prior Publication Data

US 2012/0060452 A1 Mar. 15, 2012

Related U.S. Application Data

(63) Continuation-in-part of application No. 12/807,653, filed on Sep. 10, 2010, now Pat. No. 8,728,189.

(51) Int. Cl.
*B01D 45/00* (2006.01)
*B01D 45/08* (2006.01)

(52) U.S. Cl.
CPC . *B01D 45/08* (2013.01); *Y10S 55/36* (2013.01)
USPC ......... 55/434.2; 55/440; 55/444; 55/DIG. 36; 165/158

(58) Field of Classification Search
USPC ........... 55/434.2, 440, 444, DIG. 36; 165/158
See application file for complete search history.

(56) References Cited

U.S. PATENT DOCUMENTS

| | | |
|---|---|---|
| 3,260,189 A | 7/1966 | Jensen |
| 3,698,378 A | 10/1972 | Rosenberg et al. |
| 3,827,343 A | 8/1974 | Darm |
| 3,945,812 A * | 3/1976 | Doane ............................. 95/272 |
| 4,050,368 A | 9/1977 | Eakes |
| 4,084,745 A | 4/1978 | Jones |
| 4,122,834 A | 10/1978 | Jacobs |
| 4,175,614 A | 11/1979 | Huggins |
| 4,197,907 A * | 4/1980 | Smith ............................. 165/76 |
| 4,235,220 A | 11/1980 | Hepner |
| 4,350,504 A | 9/1982 | Diachuk |
| 4,437,867 A | 3/1984 | Lerner |
| 4,769,149 A | 9/1988 | Nobilet et al. |
| 5,456,244 A | 10/1995 | Prasser |
| 5,524,607 A | 6/1996 | Grohman et al. |

(Continued)

FOREIGN PATENT DOCUMENTS

| | | |
|---|---|---|
| BE | 899292 | 7/1984 |
| EP | 0021809 | 1/1981 |

(Continued)

*Primary Examiner* — Robert A Hopkins
(74) *Attorney, Agent, or Firm* — Hartman Global IP Law; Gary M. Hartman; Domenica N. S. Hartman

(57) ABSTRACT

A filter unit and method for removing grease, oil and other particulates from air, for example, in a kitchen environment. The filter unit includes a housing having an upstream side, an downstream side, and a cavity therebetween, a heat exchanger disposed within the cavity and comprising at least two parallel tubes, at least one entrance aperture disposed on the upstream side of the housing and defined by at least one fin, at least one baffle disposed on the downstream side of the housing so as to be oppositely disposed from the at least one entrance aperture, and at least one exit aperture disposed on the downstream side of the housing adjacent the at least one baffle. The baffle and fin define at least one S-shaped flow path through the housing, and the flow path routes air around a downstream side of a first of the at least two tubes and then around an upstream side of a second of the at least two tubes.

17 Claims, 7 Drawing Sheets

(56) References Cited

U.S. PATENT DOCUMENTS 5,540,744 A 7/1996 Renna
5,558,080 A 9/1996 Grohman et al.
5,687,707 A 11/1997 Prasser
6,344,074 B1 2/2002 Ward et al.

FOREIGN PATENT DOCUMENTS

| EP | 0036659 | 9/1981 |
| FR | 2443033 | 6/1980 |
| FR | 2482703 | 11/1981 |
| SU | 522377 | 9/1976 |

\* cited by examiner

FILTER AND METHOD FOR GREASE FILTRATION

CROSS REFERENCE TO RELATED APPLICATIONS

This is a continuation-in-part patent application of co-pending U.S. patent application Ser. No. 12/807,653, filed Sep. 10, 2010. The entire contents of this application are incorporated herein by reference.

BACKGROUND OF THE INVENTION

The present invention generally relates to filters of the type used in cooking environments to remove grease, oil and other particulates from the air.

BRIEF DESCRIPTION OF THE INVENTION

The present invention provides a filter unit and method for removing grease, oil and other particulates from air, for example, in a kitchen environment.

According to a first aspect of the invention, the filter unit includes a housing having an upstream side, a downstream side, and a cavity therebetween, a heat exchanger disposed within the cavity and comprising at least two parallel tubes, at least one entrance aperture disposed on the upstream side of the housing and defined by at least one fin, at least one baffle disposed on the downstream side of the housing so as to be oppositely disposed from the at least one entrance aperture, and at least one exit aperture disposed on the downstream side of the housing adjacent the at least one baffle. The baffle and fin define at least one S-shaped flow path through the housing, and the flow path routes air around a downstream side of a first of the at least two tubes and then around an upstream side of a second of the at least two tubes. The S-shaped flow path promotes removal of grease and oil particulates from the air and inhibits the passage of a flame through the housing.

Another aspect of the invention is a filtration method using the filter unit described above.

Other aspects and advantages of this invention will be better appreciated from the following detailed description.

DETAILED DESCRIPTION OF THE INVENTION

The contents of co-pending United States patent application Ser. No. 12/807,653, filed Sep. 10, 2010, including the discussion therein relating to FIGS. 1 through 8, are incorporated herein by reference. Accordingly, the following discussion will focus primarily on clarifications and additional aspects of the embodiments represented in FIGS. 1 through 8. Other aspects of the embodiments not discussed in any detail can be, in terms of structure, function, materials, etc., essentially as was described in U.S. patent application Ser. No. 12/807,653.

Figure 1:
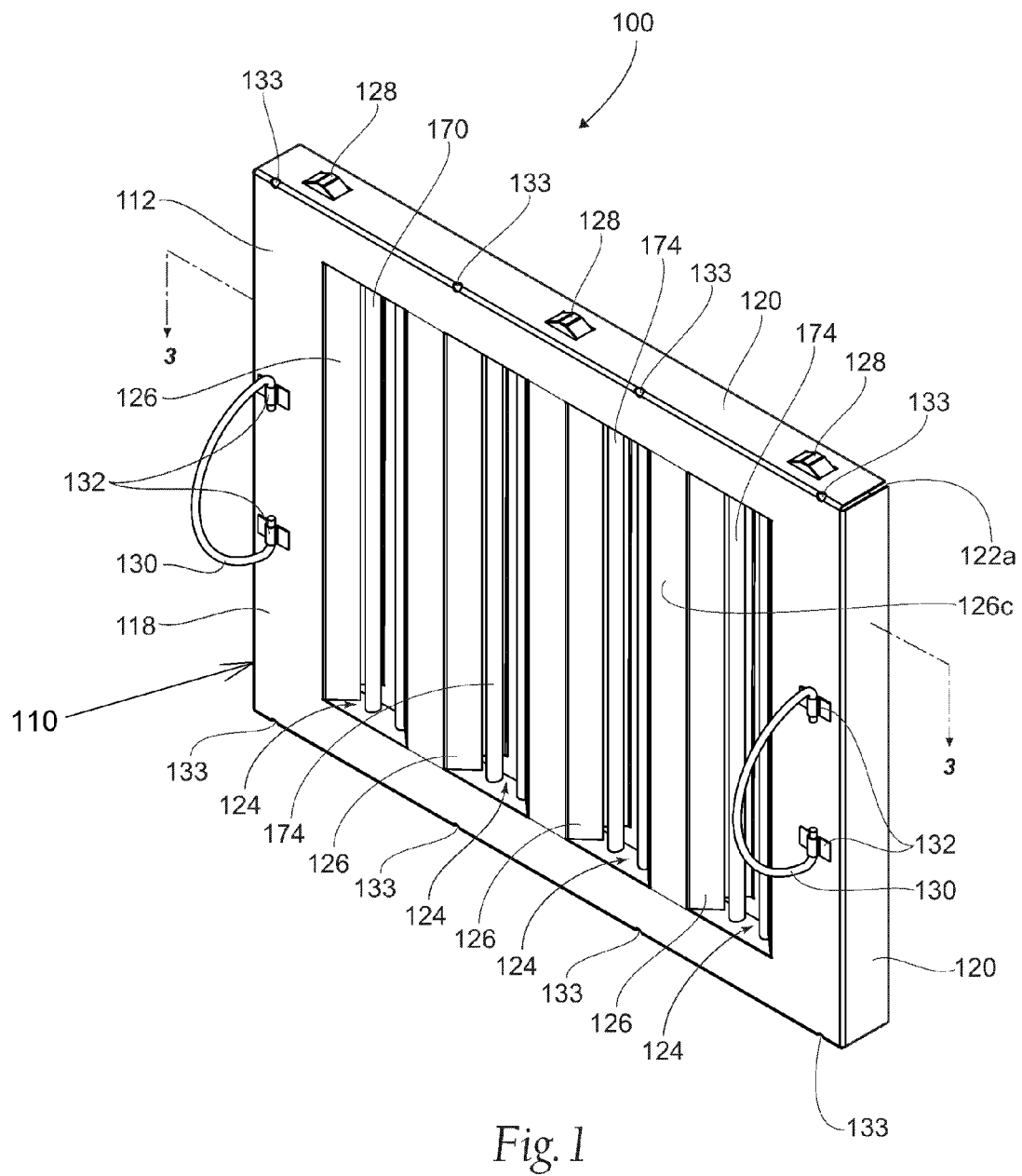
FIG. 1 is a perspective view of a filter unit in accordance with an embodiment of this invention.
Figure 2:
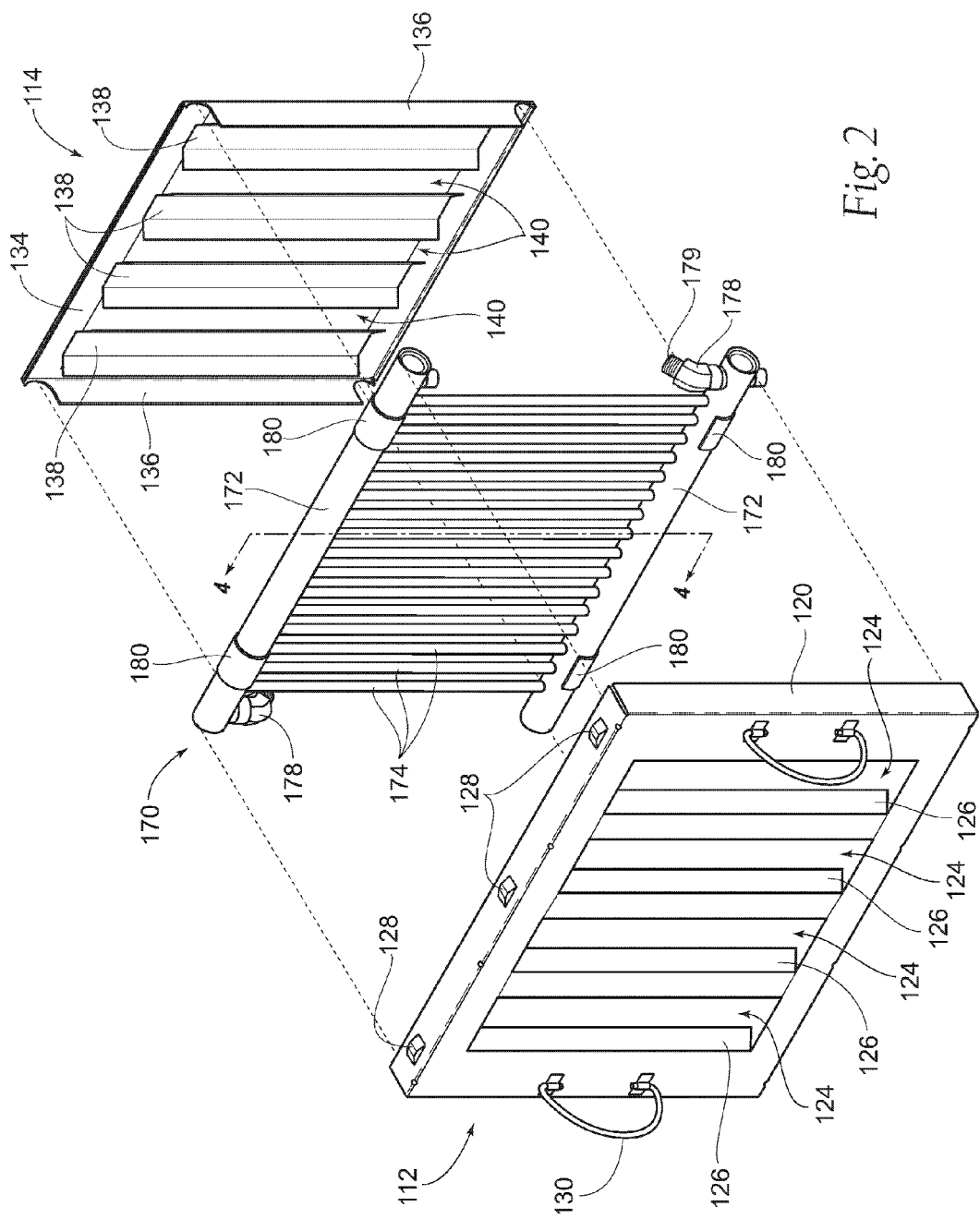
FIG. 2 represents an exploded view of the filter unit of FIG. 1, and shows a heat exchanger and a housing comprising a base and cover.
Figure 3:
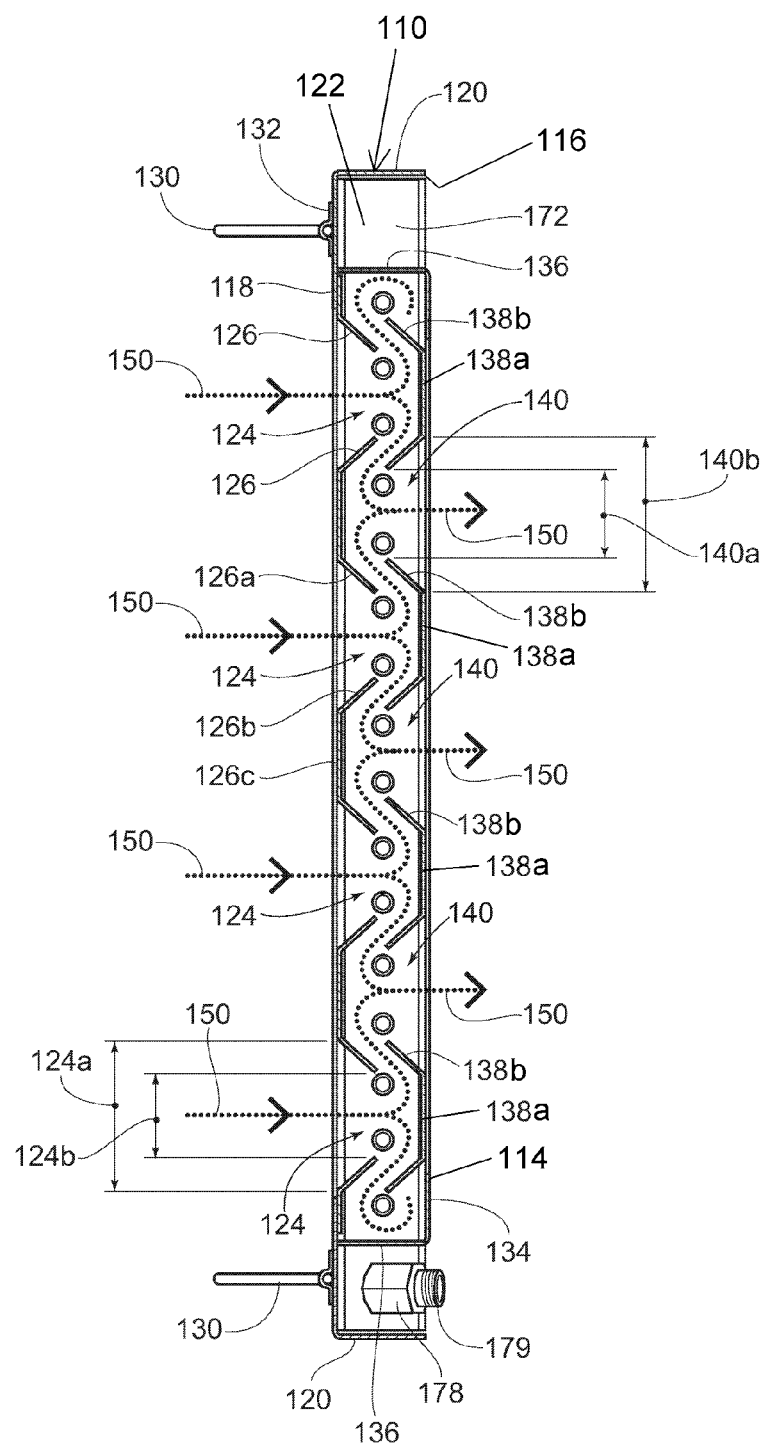
FIG. 3 represents a cross-sectional view of the filter unit taken along section line 3-3 of FIG. 1.
Figure 4:
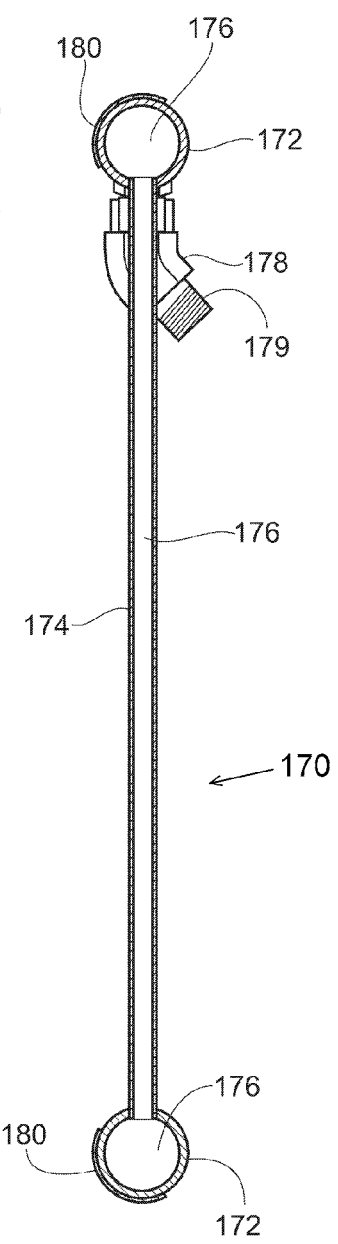
FIG. 4 represents a cross-sectional view of the heat exchanger taken along section line 4-4 of FIG. 2.
Figure 5:
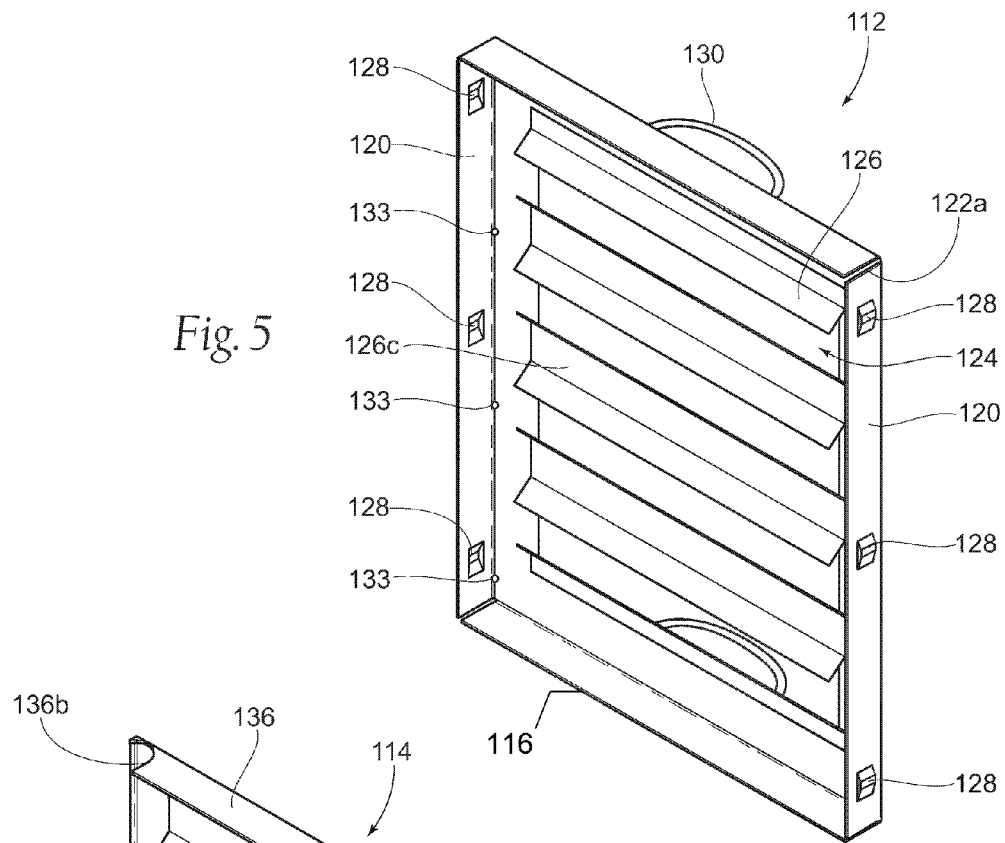
FIG. 5 represents a perspective view of the base of the housing shown in FIG. 2.
Figure 6:
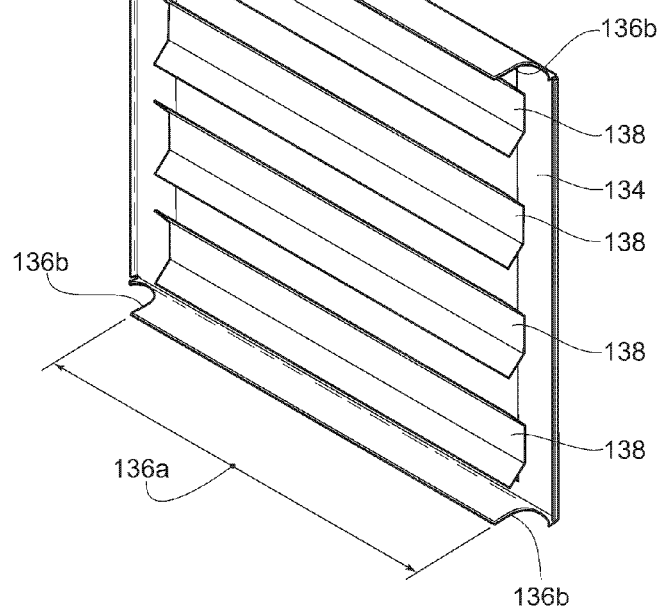
FIG. 6 represents a perspective view of the cover of the housing shown in FIG. 2.
Figure 7A:
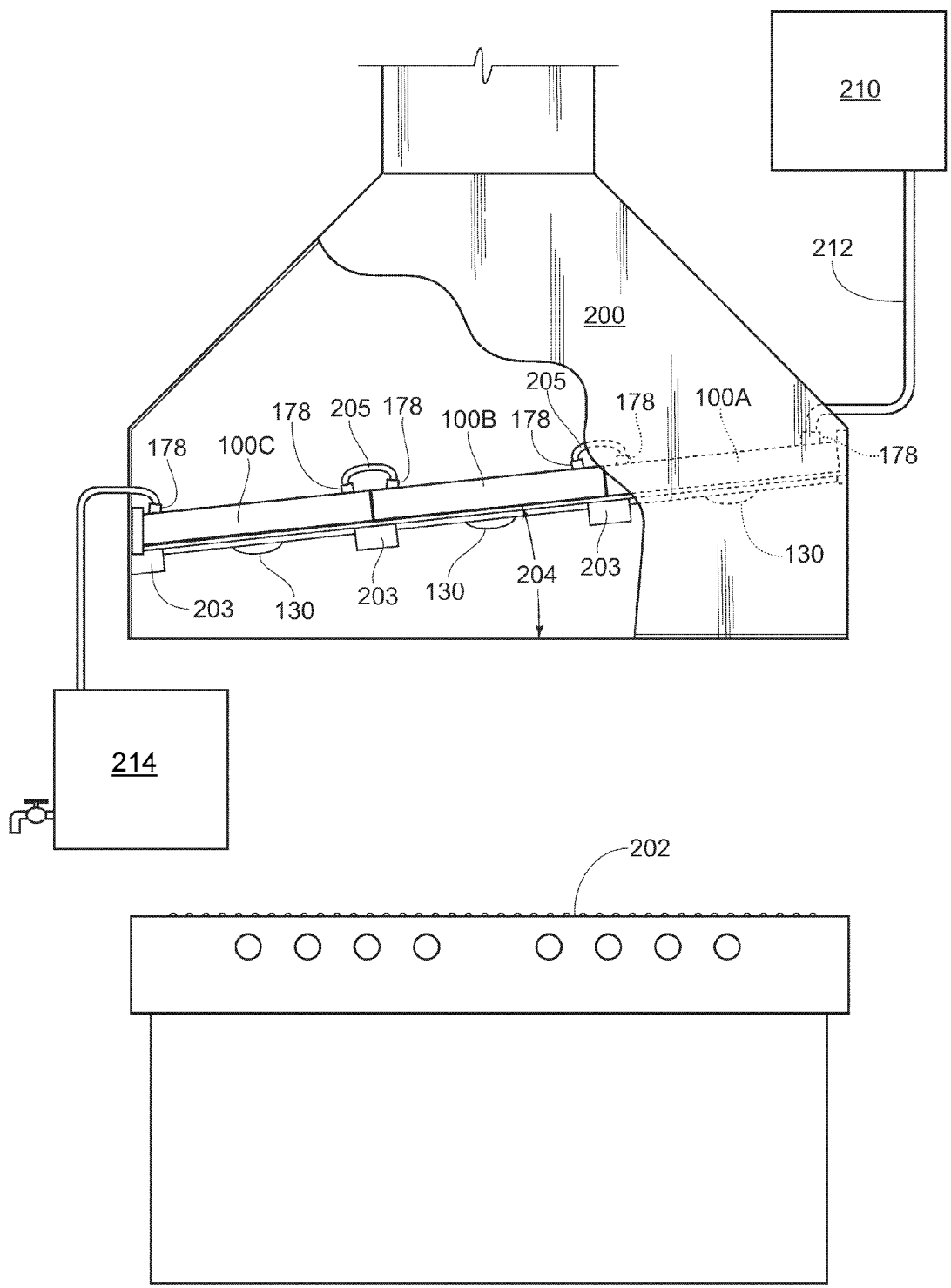
FIG. 7A schematically represents an installation for the filter unit of FIG. 1 in accordance with an embodiment of this invention.
Figure 7B:
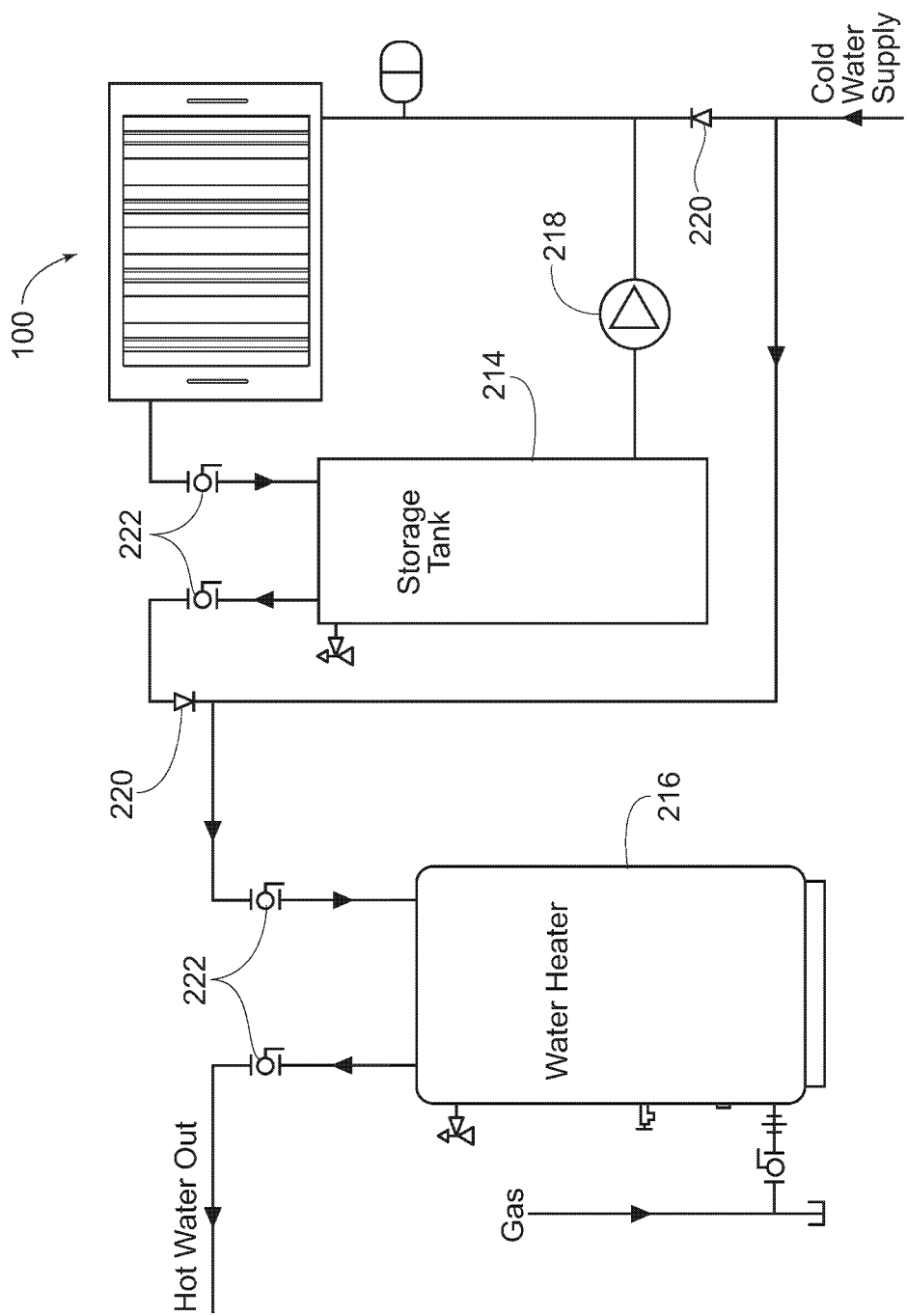
FIG. 7B is a schematic of a plumbing system containing the filter unit of FIG. 1 in accordance with another embodiment of this invention.
Figure 8:
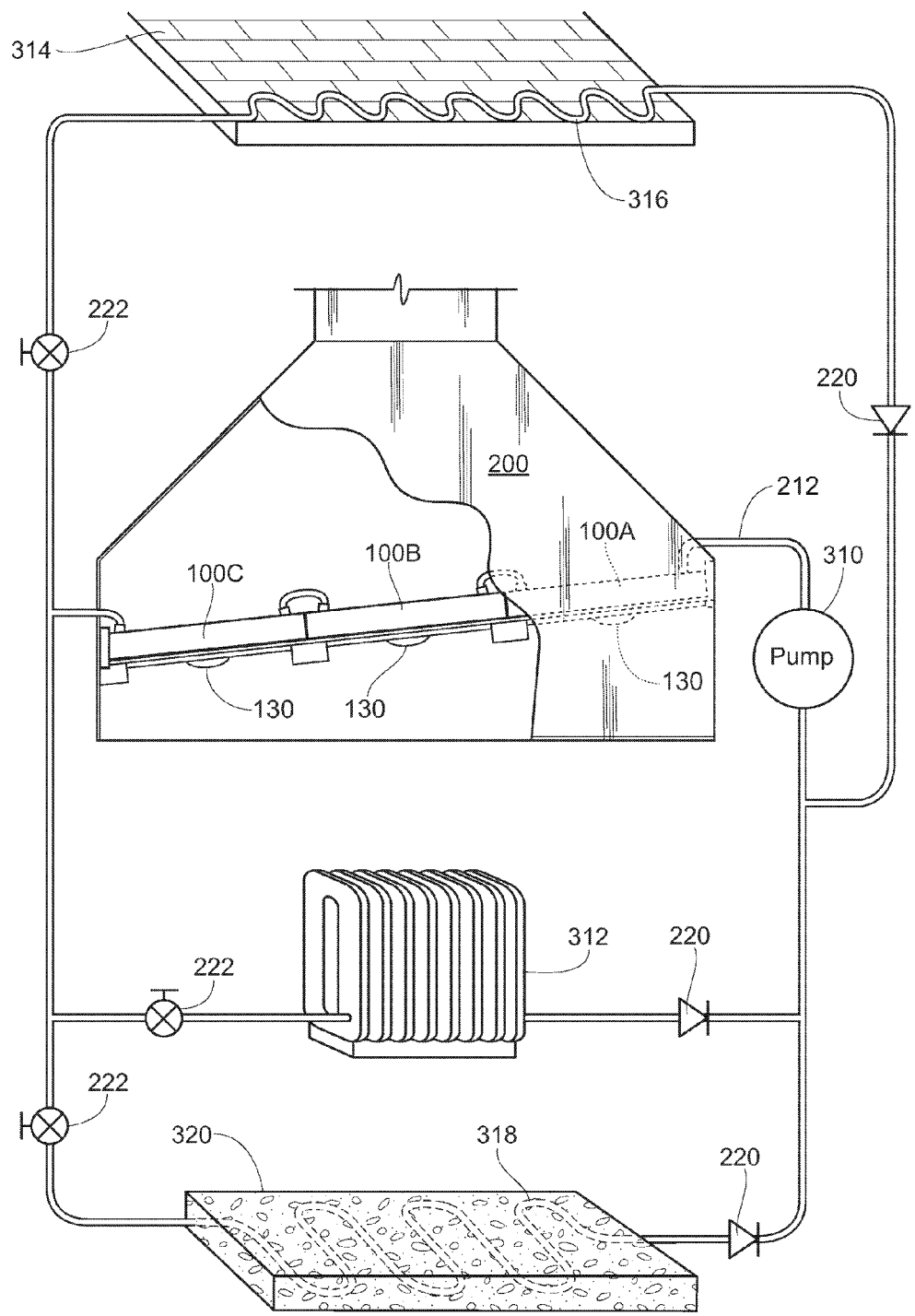
FIG. 8 schematically represents an installation for the filter unit of FIG. 1 in accordance with yet another embodiment of this invention.

In FIG. 3, the tortuous airflow path 150 through the cavity 122 of the housing 110 results in incoming air impinging the baffles 138. In particular, FIG. 3 shows the incoming air as impinging the surfaces 138a of the baffles 138 that are oriented transverse to the initial direction of airflow as it enters the housing 110. Each transverse surface 138a of each baffle 138 is located between a pair of converging walls 138b of the baffle 138 that define the openings 140 to either side of the baffle 138 and redirect the airflow toward the conduits 174 of the heat exchanger 170. The process of the air impacting the surfaces 138a of the baffles 138 initiates separation of entrained particulates from the incoming air. In a kitchen environment, such particulates are likely to include grease, oil and other matter that may be entrained in the incoming air. The particulates that collect on the baffles 138 coalesce and flow on the surfaces of the baffles 138 toward the end of the housing 110 where the drain holes 133 are located.

As also evident from FIG. 3, the airflow that is redirected toward the conduits 174 of the heat exchanger 170 impinge the interior surfaces of the fins 126, particularly the fin plates 126c of the fins 126. The process of the air impacting the surfaces of the fin plates 126c causes separation of additional particulates that may remain entrained from the air. As with the baffles 138, the particulates that collect on the fins 126 and their fin plates 126c coalesce and flow toward the end of the housing 110 where the drain holes 133 are located.

In combination, the baffles 138 and fins 126 cause the air flowing through the housing 110 to flow to the downstream side of each heat exchanger conduit 174, and then flow around the upstream side of an adjacent conduit 174 before being allowed to exit the housing 110 through one of the openings 140 between the baffles 138—effectively, an S-shaped flow path. As such, the majority of the air flows either around the downstream side of a conduit 174 or around the upstream side of a conduit 174, but generally not both. In investigations leading to the invention, a grease extraction capability of about 14:1 was achieved with an S-shaped flow path essentially as represented in FIG. 3. In addition to promoting the thermal efficiency of the heat exchanger 170 and the removal of particulates from the air, this path also serves as a flame barrier through the housing 110 and, therefore, through the filter unit 100. In particular, investigations leading to the present invention showed that the S-shaped path through the housing 110 enabled the filter unit 100 to pass the applicable standards of Underwriter Laboratories, Inc., for flammability.

While the invention has been described in terms of a specific embodiment, it is apparent that other forms could be adopted by one skilled in the art. For example, the physical configuration of the filter unit could differ from that shown, and materials and processes other than those noted could be used. Therefore, the scope of the invention is to be limited only by the following claims.

The invention claimed is:

1. A filter unit comprising:
   a housing having an upstream side, a downstream side, and a cavity therebetween;
   a heat exchanger disposed within the cavity, the heat exchanger comprising at least two parallel tubes;
   at least a first entrance aperture disposed on the upstream side of the housing and defined by at least a first fin;
   at least one baffle disposed on the downstream side of the housing so as to be oppositely disposed from the first entrance aperture;
   at least a first exit aperture disposed on the downstream side of the housing adjacent the at least a first baffle;
   wherein the first baffle and the first fin define at least one S-shaped flow path through the housing between the first entrance aperture and the first exit aperture, and the flow path routes a majority of air that enters the upstream side of the housing through the first entrance aperture around a downstream side of a first of the at least two parallel tubes, then between the first baffle and the first fin, and then around an upstream side of a second of the at least two parallel tubes before routing the air out of the downstream side of the housing through the first exit aperture, wherein the S-shaped flow path promotes removal of grease and oil particulates from the air and inhibits the passage of a flame through the housing;
   a plurality of additional entrance apertures defined by a plurality of additional fins disposed on the upstream side of the housing and a plurality of additional exit apertures defined by a plurality of additional baffles disposed on the downstream side of the housing, wherein the plurality of additional fins and the plurality of additional baffles define a plurality of additional S-shaped flow paths through the housing; and
   wherein at least two of the plurality of additional fins are disposed laterally from each other on opposite sides of one of the plurality of additional entrance apertures, two of the additional S-shaped flow paths originate at the one of the plurality of additional entrance apertures, and the two of the additional S-shaped flow paths separate to flow downstream through two of the additional exit apertures.

2. A method of filtering air using the air filter according to claim 1, the method comprising drawing air through the housing and collecting grease and oil particulates on the first baffle and on the first fin.

3. The filter unit of claim 1, wherein the first of the at least two parallel tubes of the heat exchanger is located closer to the first entrance aperture than the first exit aperture, and the second of the at least two parallel tubes of the heat exchanger is located closer to the first exit aperture than to the first entrance aperture.

4. The filter unit of claim 3, further comprising at least a third parallel tube adjacent to the first entrance aperture, and at least a fourth parallel tube adjacent to the first exit aperture.

5. The filter unit of claim 4, wherein the at least first, second, third, and fourth parallel tubes are substantially coplanar in their orientation within the cavity.

6. The filter unit of claim 1, wherein the first of the at least two parallel tubes of the heat exchanger is located adjacent to the first fin, and the second of the at least two parallel tubes of the heat exchanger is located adjacent to the first baffle.

7. The filter unit of claim 1, wherein the first of the at least two parallel tubes of the heat exchanger is located within the first entrance aperture.

8. The filter unit of claim 1, wherein the second of the at least two parallel tubes of the heat exchanger is located within the first exit aperture.

9. The filter unit of claim 1, further comprising at least a second entrance aperture defined by at least a second fin and at least a second exit aperture defined by at least a second baffle, wherein the second fin and the second baffle define a second S-shaped flow path through the housing.

10. The filter unit of claim 1, wherein the first entrance aperture is defined by at least a second fin and at least a second exit aperture is defined by at least a second baffle, and the second fin and the second baffle define at least a second S-shaped flow path through the housing.

11. The method according to claim 2, further comprising installing the filter unit in a commercial kitchen environment prior to drawing air through the housing.

12. A filter unit comprising:
    a housing having an upstream side, a downstream side, and a cavity therebetween;
    a heat exchanger disposed within the cavity, the heat exchanger comprising at least two parallel tubes;
    at least a first entrance aperture disposed on the upstream side of the housing and defined by at least a first fin;
    at least one baffle disposed on the downstream side of the housing so as to be oppositely disposed from the first entrance aperture;
    at least a first exit aperture disposed on the downstream side of the housing adjacent the at least a first baffle;
    wherein the first baffle and the first fin define at least one S-shaped flow path through the housing between the first entrance aperture and the first exit aperture, and the flow path routes a majority of air that enters the upstream side of the housing through the first entrance aperture around a downstream side of a first of the at least two parallel tubes, then between the first baffle and the first fin, and then around an upstream side of a second of the at least two parallel tubes before routing the air out of the downstream side of the housing through the first exit aperture, wherein the S-shaped flow path promotes removal of grease and oil particulates from the air and inhibits the passage of a flame through the housing;
    a plurality of additional entrance apertures defined by a plurality of additional fins disposed on the upstream side of the housing and a plurality of additional exit apertures defined by a plurality of additional baffles disposed on the downstream side of the housing, wherein the plurality of additional fins and the plurality of additional baffles define a plurality of additional S-shaped flow paths through the housing; and
    wherein at least two of the plurality of additional baffles are disposed laterally from each other on opposite sides of one of the plurality of additional exit apertures, two of the additional S-shaped flow paths originate at two of the plurality of additional entrance apertures, and the two of the additional S-shaped flow paths combine to flow downstream through the one of the plurality of additional exit apertures.

13. A filtering device comprising:
    a housing having an upstream side, a downstream side, and a cavity therebetween;
    a heat exchanger disposed within the cavity, the heat exchanger comprising a plurality of parallel tubes;
    a plurality of entrance apertures disposed on the upstream side of the housing and defined by a plurality of fins, each of the plurality of entrance apertures being between a pair of the plurality of fins;

a plurality of baffles disposed on the downstream side of the housing so as to be oppositely disposed from the plurality of entrance apertures;

a plurality of exit apertures disposed on the downstream side of the housing adjacent to the plurality of baffles, each of the plurality of exit apertures being between a pair of the plurality of baffles;

wherein the plurality of baffles and the plurality of fins define a plurality of S-shaped flow paths through the housing between the plurality of entrance apertures and the plurality of exit apertures, and the flow paths route a majority of air that enters the upstream side of the housing through the plurality of entrance aperture around a downstream side of a first group of the plurality of parallel tubes, then between pairs of the plurality of baffles and the plurality of fins, and then around an upstream side of a second group of the plurality of parallel tubes before routing the air out of the downstream side of the housing through the plurality of exit apertures, wherein the S-shaped flow paths promote removal of grease and oil particulates from the air and inhibits the passage of a flame through the housing; and wherein the plurality of fins and baffles are disposed in pairs laterally offset from each other, and two of the plurality of S-shaped flow paths originate upstream at each of the plurality of entrance apertures.

14. The filtering device of claim 13, wherein each tube of the first group of the plurality of parallel tubes is adjacent a corresponding one of the plurality of entrance apertures, and wherein each tube of the second group of the plurality of parallel tubes is adjacent a corresponding one of the plurality of exit apertures.

15. The filtering device of claim 13, wherein each tube of the first group of the plurality of parallel tubes is adjacent a corresponding one of the plurality of fins, and each tube of the second group of the plurality of parallel tubes is adjacent a corresponding one of the plurality of baffles.

16. The filtering device of claim 13, wherein each tube of the first group of the plurality of parallel tubes is within a corresponding one of the plurality of entrance apertures.

17. The filtering device of claim 13, wherein each tube of the second group of the plurality of parallel tubes is within a corresponding one of the plurality of exit apertures.

* * * * *